United States Patent
Margalit et al.

(10) Patent No.: US 12,145,883 B2
(45) Date of Patent: *Nov. 19, 2024

(54) COMPOSITIONS COMPRISING AN ACRYLIC POLYMER AND PROCESSES OF PREPARING THE SAME

(71) Applicant: CAESARSTONE LTD., Kibbutz Sdot-Yam (IL)

(72) Inventors: Erez Margalit, Moshav Merhavia (IL); Boris Gorelik, Tzur Hadaasa (IL); Alon Golan, Nesher (IL); Yaacov Ron, Ahuzat Barak (IL); Ido Winer, Mizpe Aviv (IL)

(73) Assignee: CAESARSTONE LTD., Kibbutz Sdot-Yam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,304

(22) Filed: May 18, 2023

(65) Prior Publication Data

US 2023/0286863 A1    Sep. 14, 2023

Related U.S. Application Data

(63) Continuation of application No. 16/760,643, filed as application No. PCT/IL2018/051118 on Oct. 18, 2018, now Pat. No. 11,691,917.

(30) Foreign Application Priority Data

Nov. 1, 2017  (GB) .................................... 1718089

(51) Int. Cl.
C04B 26/06    (2006.01)
C04B 14/06    (2006.01)
(Continued)

(52) U.S. Cl.
CPC .............. C04B 26/06 (2013.01); C04B 14/06 (2013.01); C04B 14/10 (2013.01); C04B 14/22 (2013.01);
(Continued)

(58) Field of Classification Search
CPC ......... C04B 26/06; C04B 14/06; C04B 14/10; C04B 14/22; C04B 14/28;
(Continued)

(56) References Cited

U.S. PATENT DOCUMENTS 3,333,021 A    7/1967  Geipert
4,536,523 A    8/1985  Antonucci
(Continued)

FOREIGN PATENT DOCUMENTS

CA        1083617        8/1980
CN    101570413 A       11/2009
(Continued)

OTHER PUBLICATIONS

Roberts, D. E. (1950). Heats of Polymerization. A Summary of Published Values and Their Relation to Structure. Journal of Research of the National Bureau of Standards, 44(3), 221-232. https://doi.org/10.6028/jres.044.021.
(Continued)

*Primary Examiner* — Michael M. Bernshteyn
(74) *Attorney, Agent, or Firm* — The Roy Gross Law Firm, LLC; Roy Gross

(57) ABSTRACT

Composites made of a cross-linked acrylic polymer and an inorganic aggregate and/or mineral, with the cross-linked acrylic polymer being present at a concentration of 5% to 17%, by weight, are disclosed. Processes of preparing the composites are also disclosed.

11 Claims, 7 Drawing Sheets

(51) Int. Cl.
  *C04B 14/10* (2006.01)
  *C04B 14/22* (2006.01)
  *C04B 14/28* (2006.01)
  *C04B 103/00* (2006.01)
  *C08F 220/14* (2006.01)
  *C08F 220/18* (2006.01)
  *C08F 236/20* (2006.01)
  *C08F 236/22* (2006.01)
  *C08F 265/04* (2006.01)
  *C08K 5/00* (2006.01)
  *C08K 5/14* (2006.01)

(52) U.S. Cl.
  CPC ............ *C04B 14/28* (2013.01); *C08F 220/14* (2013.01); *C08F 220/1808* (2020.02); *C08F 236/20* (2013.01); *C08F 236/22* (2013.01); *C08F 265/04* (2013.01); *C08K 5/0025* (2013.01); *C08K 5/14* (2013.01); *C01P 2006/60* (2013.01); *C04B 2103/0059* (2013.01); *C04B 2103/0062* (2013.01)

(58) Field of Classification Search
  CPC ..... C04B 2103/0059; C04B 2103/0062; C08F 220/1808; C08F 220/14; C08F 236/20; C08F 236/22; C08F 265/04; C08K 5/0025; C08K 5/14
  USPC ........................................................ 524/853
  See application file for complete search history.

(56) References Cited

U.S. PATENT DOCUMENTS

| | | | |
|---|---|---|---|
| 5,244,941 A | 9/1993 | Bruckbauer et al. | |
| 6,323,259 B1 | 11/2001 | Ikegami et al. | |
| 6,387,985 B1* | 5/2002 | Wilkinson | C08K 3/22 |
| | | | 523/171 |
| 7,001,660 B2 | 2/2006 | Garitano | |
| 7,727,435 B2* | 6/2010 | Ghahary | B44C 5/0453 |
| | | | 264/102 |
| 7,923,099 B2 | 4/2011 | Park et al. | |
| 8,653,165 B2* | 2/2014 | Danielson | C08K 5/00 |
| | | | 524/543 |
| 8,925,460 B2 | 1/2015 | Sims | |
| 9,260,344 B1* | 2/2016 | Zhao | B29C 48/07 |
| 9,796,637 B2 | 10/2017 | Albalak | |
| 2003/0113485 A1 | 6/2003 | Schober | |
| 2007/0244222 A1* | 10/2007 | Ghahary | B44C 5/0453 |
| | | | 264/102 |
| 2008/0113124 A1 | 5/2008 | Park et al. | |
| 2008/0182193 A1 | 7/2008 | Agur et al. | |
| 2013/0137810 A1 | 5/2013 | Shin | |

FOREIGN PATENT DOCUMENTS

| | | |
|---|---|---|
| CN | 103130963 A | 6/2013 |
| CN | 103570275 A | 2/2014 |
| EP | 1674513 A1 | 6/2006 |
| EP | 1878712 A1 | 1/2008 |
| GB | 2151187 A | 7/1985 |
| GB | 2306964 A | 5/1997 |
| JP | S51-5383 A | 1/1976 |
| JP | S55-106205 A | 8/1980 |
| JP | S61-60716 A | 3/1986 |
| JP | S63-265907 A | 11/1988 |
| JP | H02253953 A | 10/1990 |
| JP | H0539414 A | 2/1993 |
| JP | 05-078545 A | 3/1993 |
| JP | H09194673 A | 7/1997 |
| JP | 2002-504179 A | 2/2002 |
| JP | 2004-509983 A | 4/2004 |
| JP | 2007-16189 A | 1/2007 |
| JP | 2009-526123 A | 7/2009 |
| WO | 1998059006 A1 | 12/1998 |
| WO | 2017153764 A1 | 9/2017 |

OTHER PUBLICATIONS

PCT International Search Report for International Application No. PCT/IL2018/051118, mailed Jan. 30, 2019, 4pp.
PCT Written Opinion for International Application No. PCT/IL2018/051118, mailed Jan. 30, 2019, 6pp.
PCT International Preliminary Report on Patentability for International Application No. PCT/IL2018/051118, issued May 5, 2020, 7pp.
Japanese Office Action of Application No. 2020-543430 dated Nov. 1, 2022.

* cited by examiner

COMPOSITIONS COMPRISING AN ACRYLIC POLYMER AND PROCESSES OF PREPARING THE SAME

CROSS-REFERENCE TO RELATED APPLICATIONS

This application is Continuation of application Ser. No. 16/760,643, filed on Apr. 30, 2020, now U.S. Pat. No. 11,691,917, which is a National Phase of PCT Patent Application No. PCT/IL2018/051118 having International filing date of Oct. 18, 2018, which claims the benefit of priority from UK Patent Application no. GB1718089.4 filed on Nov. 1, 2017. The content of the above applications are all incorporated by reference as if fully set forth herein in their entirety.

FIELD OF INVENTION

This invention is directed, inter alia, to a composite comprising a crosslinked acrylic polymer, and an inorganic aggregate and/or mineral.

BACKGROUND OF THE INVENTION

Engineered stones are widely used as building materials e.g., for kitchen countertops, indoor and outdoor floors, dressing tables, bathtubs, wash bowls, and interior articles. Artificial stone products are in great demand due to their ability to be manufactured in a wide variety of patterns and colors that cannot be found in nature, and to show superior physical and mechanical performance, when compared to natural stone.

These artificial marbles are generally manufactured from unsaturated polyester thermoset compositions that comprise e.g., vinyl monomeric units, styrene as a reactive solvent and cobalt-octoate as a curing process accelerator. One disadvantage of these known engineered stone compositions is the tendency of the styrene moiety to shrink which might cause micro- and macro-cracks and decrease of the bending strength and the toughness of the engineered stones. Another disadvantage is the polyester's poor light fastness in an outdoor environment.

SUMMARY OF THE INVENTION

This invention is directed, inter alia, to a composite comprising a crosslinked acrylic polymer, and an inorganic aggregate and/or mineral.

The present inventors have surprisingly uncovered that composites having a specific percentage range of cross-linked acrylic polymer and an inorganic aggregate and/or mineral exhibit exceptional mechanical properties and stability to U.V. irradiation.

According to an aspect of some embodiments of the present invention there is provided a composition comprising a composite, the composite comprising a cross-linked acrylic polymer and at least one an inorganic aggregate and/or mineral, wherein the cross-linked acrylic polymer is present at a concentration of 5 to 17%, by weight of the composite.

In some embodiments, the inorganic aggregate and/or mineral is selected from the group comprising of: quartz, quartzite, clay, calcium carbonate, aluminum hydroxide, magnesium hydroxide, or any combination thereof.

In some embodiments, the inorganic aggregate and/or mineral is present at a concentration of 82% to 95%, by total weight of the composite.

In some embodiments, the composite exhibits a CIELAB color shift ($\Delta E$) of less than 3 after 1000 hours exposure to irradiance of 65 W/m$^2$ according to ISO 4892-2.

In some embodiments, the composite exhibits a CIELAB b coordinate difference (Ab) of less than 3 after 1000 hours exposure to irradiance of 65 W/m$^2$ according to ISO 4892-2.

In some embodiments, 82% to 94%, by weight, of an inorganic aggregate and/or mineral is in the form of one or more particles having a median diameter in the range of 0.001 to 4 mm.

In some embodiments, the acrylic polymer comprises a plurality of monomeric units selected from acrylate, or any derivative thereof.

In some embodiments, the acrylate is selected from: methacrylate, methyl methacrylate (MMA), 2-ethylhexyl acrylate (2-EHA), 2-ethylhexyl methacrylate, n-butyl acrylate, n-butyl methacrylate, isobutyl methacrylate, isobornyl acrylate, isobornyl methacrylate, and any derivative or combination thereof. In some embodiments, the monomeric unit comprises 2-EHA and MMA. In some embodiments, the MMA and 2-EHA are present at a weight ratio ranging from 5:1 to 3:1, respectively.

In some embodiments, the cross-linked acrylic polymer comprises a cross-linker selected from the group comprising of: triethylene glycol diacrylate, trimethylolpropane triacrylate (TMPTA), trimethylolpropane trimethacrylate (TMPTMA), pentaerythritol tetraacrylate, dipentaerithritol hexaacrylate, dendritic acrylates, and methacrylates having at least two functional groups, or any derivative or combination thereof.

In some embodiments, the composite further comprises a toughener. In some embodiments, the toughener is selected from the group comprising of: urethane mono acrylate, urethane diacrylate, urethane triacrylate, or any combination thereof. In some embodiments, the toughener is present at a concentration of 0.5% to 15%, by weight of the cross-linked polymer.

In some embodiments, the composite is characterized by glass-transition temperature ($T_g$) in the range of from 50 to 90° C.

In some embodiments, the composite is characterized by flexural strength in the range of 45 to 95 MPa.

In some embodiments, the composite is characterized by Young's modulus in the range of 11,000 to 25,000 MPa.

In some embodiments, the composite is characterized by heat distortion temperature (HDT) of at least 55° C.

In some embodiments, the composite further comprises a coupling agent attached to a backbone of the polymer, wherein the coupling agent is configured to contact the inorganic aggregate and/or mineral.

In some embodiments, the coupling agent is physically attached to the inorganic aggregate and/or mineral. In some embodiments, the coupling agent is covalently attached to the polymeric backbone. In some embodiments, the coupling agent is derived from acryloyl. In some embodiments, the coupling agent comprises alkoxysilane. In some embodiments, the coupling agent is present at a concentration ranging from 0.02% to 0.4%, by weight of the composite.

According to an aspect of some embodiments of the present invention there is provided a method for obtaining a composition comprising a composite, the composite comprising a cross-linked acrylic polymer and at least one inorganic aggregate and/or mineral, the method comprising the steps of:

a. mixing a plurality of acrylic monomers, at least one cross-linker, a radical initiator, and optionally at least one agent selected from: a toughener, and polymer stabilizer, thereby obtaining a mixture of the cross-linked polymer;
b. adding an inorganic aggregate and/or mineral to the mixture, the inorganic aggregate and/or mineral being at a concentration of 80% to 95%, by weight of the mixture, and
c. curing the mixture at a temperature of above 80° C., thereby obtaining the composition.

In some embodiments, the curing step further comprises a step of adding a radical initiator to the mixture.

In some embodiments, the initiator is selected from the group comprising of: di-benzoyl peroxide, lauroyl peroxide, tert-butyl hydroperoxide, cyclohexanone peroxide, methylethyl peroxide, tert-butyl peroxyoctoate, tert-butyl peroxybenzoate, dicumyl peroxide, 1,1-bis(tert-butyl peroxy)3,3,5-trim ethylcyclohexane, tert-butyl peroxymaleate, Azobisisobutyronitrile (AIBN), and any derivative or combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

Figure 1A:
FIGS. 1A-1C present photographs demonstrating cracks/breaks in the slabs as described in Table 5 below: "Grain 1" (5% acrylic resin) after pressing (FIG. 1A) and after curing (FIG. 1B); and "Grain 6" (showing slab made of non-powder: powder fraction weight ratio of 12.2): demonstrating dry areas and crumbling after curing (FIG. 1C).

The present invention, in some embodiments thereof, is directed to a composite comprising a cross linked polymeric backbone having acrylic monomeric units, and inorganic aggregate and/or mineral. In one embodiment, a mineral is in the form of an aggregate or a "mineral aggregate". In one embodiment, a mineral or a mineral aggregate comprises/consists a single mineral type. In one embodiment, a mineral or a mineral aggregate comprises/consists a mixture of different mineral types.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The Composition

The present invention, in some embodiments thereof, relates to a composite, comprising a cross-linked acrylic polymer and at least one inorganic aggregate and/or mineral, wherein the cross-linked acrylic polymer is present at a concentration of e.g., 2 to 250% or 3 to 20%, by weight of the composite.

As demonstrated in the Examples section below, the disclosed composites having the current percentage range of cross-linked acrylic polymer and an inorganic aggregate and/or mineral exhibit exceptional mechanical properties and stability to electromagnetic radiation and/or light and/or ultraviolet (U.V.) irradiation.

In some embodiments, there is provided a composition comprising the disclosed composite in an embodiment thereof.

In some embodiments, the term "acrylic polymer" refers to a polymer comprising of a polymeric backbone which comprises at least one acrylic group (also referred to as: "acrylic monomeric unit").

In some embodiments, the composite comprises from 1% to 40%, or from 3% to 30%, or from 5% to 20%, acrylic polymer, by weight of the composite.

In some embodiments, the cross-linked acrylic polymer is present at a concentration of 5% to about 25%, by weight of the composite. In some embodiments, the cross-linked acrylic polymer is present at a concentration of from about 10% to about 25%, by weight of the composite. In some embodiments, the cross-linked acrylic polymer is present at a concentration of from about 5% to about 30%, by weight of the composite. In some embodiments, the cross-linked acrylic polymer is present at a concentration of from about 10% to about 30%, by weight of the composite. In some embodiments, the cross-linked acrylic polymer is present at a concentration of from about 7% to about 20%, by weight of the composite. In some embodiments, the cross-linked acrylic polymer is present at a concentration of from about 7% to about 25%, by weight of the composite. In some embodiments, the composite comprises about 10%, by weight of cross-linked polymer.

In some embodiments, the cross-linked acrylic polymer is present at a concentration of: 3 to 20%, 5 to 20%, 3 to 17%, 5 to 17%, or 5 to 15%, by weight of the composite, including any value and range therebetween.

In some embodiments, the cross-linked acrylic polymer is present at a concentration of 3%, 4%, 5%, 6%, 7%, 8%, 9%, 10%, 11%, 12%, 13%, 14%, 15%, 16%, 17%, 18%, 19%, or 20%, by weight of the composite, including any value and range therebetween.

In some embodiments, the composite comprises less than 70%, less than 75%, less than 80%, less than 85%, less than 90%, less than 91%, less than 92%, less than 93%, or less than 95%, by weight, of inorganic aggregate and/or mineral.

In some embodiments, the inorganic aggregate and/or mineral is present at a concentration ranging from 75% to 93%, by weight, of the composite. In some embodiments, the inorganic aggregate and/or mineral is present at a concentration ranging from 70% to 93%, by weight, of the composite. In some embodiments, the inorganic aggregate and/or mineral is present at a concentration ranging from 70% to 90%, by weight, of the composite. In some embodiments, the inorganic aggregate and/or mineral is present at a concentration ranging from 75% to 90%, by weight, of the composite. In some embodiments, the inorganic aggregate and/or mineral is present at a concentration ranging from 80% to 90%, by weight, of the composite. In some embodiments, the inorganic aggregate and/or mineral is present at a concentration ranging from 85% to 95%, by weight, of the composite. In some embodiments, the inorganic aggregate and/or mineral is present at a concentration ranging from 85% to 93%, by weight, of the composite. In some embodiments, the composite comprises about 90% of at least one inorganic aggregate and/or mineral, by weight, of the composite In some embodiments, the inorganic aggregate and/or mineral is present at a concentration of: 80% to 97%, 80% to 97%, 82% to 97%, 85% to 97%, or 85% to 95%, by weight of the composite, including any range therebetween. In some embodiments, the inorganic aggregate and/or mineral is present at a concentration of 80%, 84%, 85%, 86%, 87%, 88%, 89%, 90%, 91%, 92%, 93%, 94%, 95%, 96%, or 97%, by weight of the composite, including any value and range therebetween.

In one embodiment, an inorganic aggregate and/or mineral is a single inorganic aggregate and/or mineral. In one embodiment, an inorganic aggregate and/or mineral is a combination of at least two inorganic aggregate and/or minerals.

In some embodiments, the composite comprises a cross-linked acrylic polymer and one or more inorganic aggregates and/or minerals, at a weight ratio ranging from 1:20 to 1:1. In some embodiments, the composite comprises a cross-linked acrylic polymer and one or more inorganic aggregates and/or minerals, at a weight ratio ranging from 1:10 to 1:1. In some embodiments, the composite comprises a cross-linked acrylic polymer and one or more inorganic aggregates and/or minerals, at a weight ratio ranging from 1:8 to 1:2. In some embodiments, the composite comprises a cross-linked acrylic polymer and one or more inorganic aggregate and/or minerals, at a weight ratio ranging from 1:6 to 1:4, e.g., 1:6, 1:5, or 1:4, respectively, including any value and range therebetween.

In some embodiments, the composite is in the form of a slab. In some embodiments, the inorganic aggregate and/or mineral comprises a ceramic material.

In some embodiments, the ceramic material is selected from, without being limited thereto, alumina, zirconia, alumina, quartz, quartzite, zirconia, titania, silica, magnesia, silicon carbide, silicon nitride, boron carbide, boron nitride, aluminum nitride, cordierite, sialon, yttria, or any mixture thereof.

In some embodiments, the inorganic aggregate and/or mineral is selected from, without being limited thereto, clay, calcium carbonate, aluminum hydroxide, magnesium hydroxide, aluminum oxide, or any combination thereof. In exemplary embodiments, the inorganic aggregate and/or mineral is quartz.

In some embodiments, the inorganic aggregate and/or mineral(s) is in the form of one or more particles.

In some embodiments, the particles are classified into at least two, or, in some embodiments, three groups according to their size, each group being categorized with respect to the relative diameter of the particle: "large", "medium" and "small", as described herein.

In some embodiments, the particles are characterized by a diameter of less than 8 mm. In some embodiments, "a diameter" is the largest diameter of a particle. In some embodiments, the particles are characterized by a diameter of less than 4 mm. In some embodiments, the particles are characterized by a diameter of from 0.1 µm to 8 mm. In some embodiments, the particles are characterized by a diameter of from 1 µm to 8 mm. In some embodiments, the particles are characterized by a diameter of from 1 µm to 4 mm.

In some embodiments, at least 80%, at least 85%, at least 90%, or at least 95%, by weight, of said inorganic aggregate and/or mineral is in the form of a plurality of particles having a median diameter ranging from 0.001 to 4 mm.

Herein, the term "diameter" may encompass a size of at least one dimension, e.g., length. In some embodiments, the term "diameter" refers to a median size of a plurality of particles. Herein, by "particles", it is meant to refer to one or more particles.

In some embodiments, the small particles are characterized by a diameter of from 0.1 µm to 50 µm. In some embodiments, the small particles are characterized by a diameter of from 0.1 to 45 µm. In some embodiments, the small particles are characterized by a diameter of from 1 to 50 µm.

In some embodiments, the small particles are characterized by a diameter of from 2 to 50 µm. In some embodiments, the small particles are characterized by a diameter of from 3 to 45 µm.

In some embodiments, the small particles are characterized by a diameter of 1, 5, 10, 15, 20, 25, 30, 35, 40, 45, or 50 µm, including any value and range therebetween.

In some embodiments, the medium particles are characterized by a diameter of from 0.05 to 1.5 mm. In some embodiments, the medium particles are characterized by a diameter of from 0.05 to 1.3 mm. In some embodiments, the medium particles are characterized by a diameter of from 0.07 to 1.2 mm. In some embodiments, the medium particles are characterized by a diameter of from 0.05 to 1 mm. In some embodiments, the medium particles are characterized by a diameter of from 0.06 mm to 1 mm. In some embodiments, the medium particles are characterized by a diameter of 0.05, 0.06, 0.1, 0.5, or 1 mm, including any value and range therebetween.

In some embodiments, the small particles and the medium particle are present at a total amount of 40% to 100%, 50% to 100%, 70% to 96%, 75% to 94%, or 82% to 94%, by weight of the inorganic aggregate and/or mineral.

In some embodiments, the small particles and the medium particle are present at a total amount of 45%, 50%, 70%, 72%, 74%, 76%, 78%, 80%, 82%, 84%, 86%, 88%, 90%, 92%, 94%, or 100%, by weight of the inorganic aggregate and/or mineral, including any value and range therebetween.

In some embodiments, the small particles of the inorganic aggregate and/or mineral are present at a total amount of 12% to 60%, by weight of the inorganic aggregate and/or mineral. In some embodiments, the small particles of the inorganic aggregate and/or mineral are present at a total amount of 12%, 15%, 20%, 25%, 30%, 35%, 40%, 45%, 50%, 55% or 60%, by weight of the inorganic aggregate and/or mineral.

In some embodiments, the large particles are characterized by a diameter of from 0.5 to 5 mm. In some embodiments, the large particles are characterized by a diameter of from 1 to 5 mm. In some embodiments, the large particles are characterized by a diameter of from 1 to 4 mm. In some embodiments, the large particles are characterized by a diameter of from 2.5 to 5 mm. In some embodiments, the large particles are characterized by a diameter of from 2.5 to 4 mm. In some embodiments, the large particles are characterized by a diameter of from 2 to 4 mm. In some embodiments, the large particles are characterized by a diameter of from 1 to 8 mm or less. In some embodiments, the large particles are characterized by a diameter of from 1 to less than 8 mm.

In some embodiments, the large particles are characterized by a diameter of 1, 2, 3, 4, 5, 6, 7, or 8 mm, including any value and range therebetween.

In some embodiments, the weight ratio of the large, medium and small particles is in the range of from 3:0.8:2.5 to 10:3:8, respectively, including any value and range therebetween. In some embodiments, the weight ratio of the large, medium and small particles is in the range of from 6:1:0.1 to 1.5:1:0.1, respectively, including any value and range therebetween. In some embodiments, the weight ratio of the large, medium to small particles is in the range of from 4:1, 3.5:1, 3:1, 2.5:1, 2:1, 1.5:1, 1.4:1, or 1.3:1, respectively, including any value and range therebetween.

The term "cross-linking density" refers to the density of the cross-links formed in the resulting "cross-linked polymer". The cross-linking percent may be calculated by using the percent solubility of the polymer of the acrylic polymer in a volume of a solvent (e.g., toluene) indicating the relative cross-linking of the polymer.

In some embodiments, the term "crosslinked" and/or "crosslinking", as used herein, and any grammatical derivative thereof refers generally to a chemical process or the corresponding product thereof in which two chains of polymeric molecules are attached by bridges, a "cross-linker", composed of an element, a group or a compound, which join certain carbon atoms of the chains by primary chemical. Therefore, in some embodiments, the general properties of a cross-linker compound, include: having bi- or poly-functional groups enabling attachment to at least two moieties.

In some embodiments, disclosed the cross-linked polymer is characterized by a cross-linking density of less than 20 moles %, less than 16 moles %, less than 15 moles %, less than 14 moles %, less than 13 moles %, less than 12 moles %, less than 11 moles %, less than 10 moles %, less than 9 moles %, less than 8 moles %, less than 7 moles %, less than 6 moles %, or less than 5 moles % of the polymer.

In some embodiments, the cross-linked polymer is characterized by a cross-linking density in the range of from 1 mole % to 20 moles % of the polymer. In some embodiments, the cross-linked polymer is characterized by a cross-linking density in the range of from 1 mole % to 15 moles % of the polymer. In some embodiments, the cross-linked polymer is characterized by a cross-linking density in the range of from 1 mole % to 12 moles % of the polymer. In some embodiments, the cross-linked polymer is characterized by a cross-linking density in the range of from 1 mole % to 10 moles % of the polymer. In some embodiments, the cross-linked polymer is characterized by a cross-linking density in the range of from 1 mole % to 7 moles % of the polymer.

In some embodiments, the cross-linked polymer is characterized by a cross-linking density in the range of from 1 mole % to 15 moles % of the polymer. In some embodiments, the cross-linked polymer is characterized by a cross-linking density in the range of from 5 mole % to 12 moles % of the polymer. In some embodiments, the cross-linked polymer is characterized by a cross-linking density in the range of from 3 mole % to 8 moles % of the polymer.

In some embodiments, the cross-linked polymer is devoid of more than two functional monomeric units.

The term "% mole(s)" used herein refers to molar fraction or molar percentage of the cross-linked polymer. Additionally or alternatively, the cross-linking density may be calculated, assuming all double bonds of a monomer with two or more double bonds that have been reacted.

For example, and without limitation, a polymer comprising di-acrylate (Mw=286 g/mole) in a concentration of about 2% (=20 g/l) provides 2×20/286=0.14 moles of double bonds/l. Using Avogadro number=6.0×10$^{23}$ units/mole, the cross-linking density can be assessed in terms of units/l.

In some embodiments, the cross-linked polymer is characterized by a cross-linking density in the range of from $2 \times 10^{20}$ to $3 \times 10^{23}$ units/l, by total weight of the polymer. In some embodiments, the cross-linked polymer is characterized by cross-linking density in the range of from $2 \times 10^{20}$ to $2 \times 10^{24}$ units/l. In some embodiments, the cross-linked polymer is characterized by cross-linking density in the range of from $2 \times 10^{21}$ to $2 \times 10^{24}$ units/l.

In some embodiments, the cross-linked polymer is characterized by cross-linking density in the range of from $2 \times 10^{22}$ to $2 \times 10^{24}$ units/l. In some embodiments, the cross-linked polymer is characterized by cross-linking density in the range of from $2 \times 10^{22}$ to $3 \times 10^{23}$ units/l. In some embodiments, the cross-linked polymer is characterized by cross-linking density in the range of from $2 \times 10^{20}$ to $2 \times 10^{25}$ units/l. In some embodiments, the cross-linked polymer is characterized by cross-linking density in the range of from $2 \times 10^{21}$ to $2 \times 10^{25}$ units/l. In some embodiments, the cross-linked polymer is characterized by cross-linking density in the range of from $2 \times 10^{22}$ to $2 \times 10^{25}$ units/l. In some embodiments, the cross-linked polymer is characterized by cross-linking density in the range of from $1 \times 10^{23}$ to $3 \times 10^{23}$ units/l.

In some embodiments, the cross-linked polymer is characterized by a viscosity of at least 25, at least 50, at least 100, at least 150, at least 250, at least 400, at least 650, at least 800, at least 1,000, or at least 1,200 cP. In some embodiments, the cross-linked polymer is characterized by a viscosity of less than 1,200, less than 1,000, less than 800, less than 650, less than 400, less than 250, less than 100, less than 50 or less than 25 cP. In some embodiments, the cross-linked polymer is characterized by a viscosity in the range of from 50 to 1,000 cP. In some embodiments, the cross-linked polymer is characterized by a viscosity in the range of from 250 to 650 cP. In some embodiments, the cross-linked polymer is characterized by a viscosity in the range of from 25 to 1,200 cP. In some embodiments, the cross-linked polymer is characterized by a viscosity in the range of from 50 to 1,200 cP. In some embodiments, the cross-linked polymer is characterized by a viscosity in the range of from 200 to 700 cP.

In some embodiments, the polymeric backbone comprises acrylic monomeric units selected from, without being limited thereto, methyl methacrylate (MMA), 2-ethylhexyl acrylate (2-EHA), 2-ethylhexyl methacrylate, n-butyl acrylate, n-butyl methacrylate, isobutyl methacrylate, isobornyl acrylate, isobornyl methacrylate, or any monomeric unit derived from acrylic acid, methacrylic acid, or any derivative or combination thereof.

As demonstrated in the Examples section below, in some embodiments, the combination of MMA and 2-EHA, let alone in their current ratio range, provides a decrease in the module and flexural strength, indicating an increase in the flexibility of the composite product (e.g., slab).

In some embodiments, the monomeric unit comprises MMA and 2-EHA, or any derivative thereof. In some embodiments, the MMA and 2-EHA are present at different polymeric backbone, or in some embodiments, at least partially, at the same polymeric backbone (i.e. forming a co-polymer). In some embodiments, a co-polymer comprising both MMA and 2-EHA is encompassed herein.

In some embodiments, the MMA and the 2-EHA, or their derivative, are present at a weight ratio ranging from: 10:1 to 1:1, 6:1 to 2:1, or 5:1 to 3:1, respectively.

In some embodiments, the MMA and the 2-EHA are present at a weight ratio of 10:1, 9:1, 8:1, 7:1, 6:1, 5:1, 4:1, 3:1, 2:1, or 1:1, respectively, including any value and range therebetween.

In some embodiments, at least 30%, at least 40%, at least 45%, or at least 50%, by weight, of the monomeric units in the polymeric backbone are derived from methacrylate.

In some embodiments, less than 95%, less than 90%, less than 85%, less than 80%, less than 75%, less than 70%, less than 65%, less than 60%, less than 55%, or less than 50%, by weight, of the monomeric units in the polymeric backbone are derived from methacrylate.

In some embodiments, 40% to 95%, by weight, of the monomeric units in the polymeric backbone are derived from methacrylate. In some embodiments, 50% to 95%, by weight, of the monomeric units in the polymeric backbone are derived from methacrylate. In some embodiments, 40% to 90%, by weight, of the monomeric units in the polymeric backbone are derived from methacrylate. In some embodiments, 50% to 90%, by weight, of the monomeric units in the polymeric backbone are derived from methacrylate. In some embodiments, 80% to 95%, by weight, of the monomeric units in the polymeric backbone are derived from methacrylate.

In some embodiments, the cross-linker comprises: tri-ethylene glycol di-methacrylate, polyethylene glycol di-acrylate, polyethylene glycol di-methacrylate, aliphatic polyurethane di-acrylates, polyurethane di-methacrylates, butanediol di-methacrylate (BDDMA), and any derivative or a combination thereof.

Further non-limiting examples of cross-linkers are trimethylolpropane trimethacrylate (TMPTMA), trimethylolpropane triacrylate (TMPTA), pentaerythritol tetraacrylate, dipentaerythritol hexaacrylate, multi-functional dendritic acrylates and methacrylates having three or more functional groups, and any derivative or combination thereof.

In some embodiments, the cross-linker has one or more di-functional groups. In some embodiments, the cross-linker comprised/consists of di-functional groups. In some embodiments, the cross-linker has one or more tri-functional groups. In some embodiments, the cross-linker is characterized by having more than one functional group. This may enable, e.g., the attachment of the cross-linker to at least three monomeric units.

In some embodiments, the molar ratio of the polymeric backbone to one or more cross-linkers is from 1:100 to 1:2, respectively. In some embodiments, the molar ratio of the polymeric backbone to one or more cross-linkers is from 1:50 to 1:10, respectively. In some embodiments, the molar ratio of the polymeric backbone to one or more cross-linkers is from 1:120 to 1:1, respectively. In some embodiments, the molar ratio of the polymeric backbone to one or more cross-linkers is from 1:50 to 1:2, respectively. In some embodiments, the molar ratio of the polymeric backbone to one or more cross-linkers is from 1:100 to 1:10, respectively.

In some embodiments, the molar ratio of the polymeric backbone to one or more cross-linkers is from 1:100 to 1:1, respectively.

In some embodiments, the cross-linked polymer comprises less than 30%, less than 25%, less than 20%, less than 15%, less than 10%, less than 5%, less than 2%, or less than 1%, by weight, cross-linkers (from the total weight of the cross-linked polymer). In some embodiments, the cross-linked polymer comprises from 1% to 20%, by weight, cross-linkers. In some embodiments, the cross-linked polymer comprises from 0.05% to 30%, by weight, cross-linkers. In some embodiments, the cross-linked polymer comprises from 1% to 30%, by weight, cross-linkers.

In some embodiments, the composite comprises less than 1%, less than 0.5% or less than 0.1% styrene (e.g., as a free styrene or in the form of a monomeric unit) (from the total weight of the composite and/or composition). In some embodiments, the composite is devoid of, or is substantially devoid of styrene.

In some embodiments, the composite comprises less than 1%, less than 0.5% or less than 0.1%, or less than 0.01%, of heavy metals. In some embodiments, the composite is devoid of or is substantially devoid of heavy metals (e.g., cobalt) (from the total weight of the composite and/or composition). In some embodiments, by "heavy metals" it is meant to refer to transition metals.

Light Fastness

In some embodiments, the disclosed composite is electromagnetic radiation stable. In some embodiments, the disclosed composite is visible light stable. In some embodiments, the disclosed composite is U.V. stable.

In some embodiments, by "electromagnetic radiation stable", e.g., "U.V. stable" it is meant that upon illuminating the disclosed composite with the radiation (e.g., U.V. radiation), the composite remains substantially integrated (not cracked), and exhibits minimal color change, as demonstrated by e.g., ΔE color value.

The terms "U.V. light" or "U.V. radiation" refer to electromagnetic radiation with a wavelength shorter than that of visible light, but longer than X-rays, in the range 10 nm to 400 nm, and energies from 3 eV to 124 eV. In some embodiments, the term "ultraviolet radiation" refers to radiation whose wavelength is in the range from about 80 nm to about 400 nm, e.g., 300 to 400 nm. In some embodiments U.V.A. refers to a wavelength in the range of 315-400 nm. In some embodiments U.V.B. refers to a wavelength in the range of 280-315 nm. The term "visible light" refers to light having wavelengths to which the human eye has a significant response, from about 435 nm to about 670 nm.

In some embodiments, the composite exhibits a ΔE value of less than 5, less than 4, less than 3, or less than 2, after 1000 hours exposure to U.V. irradiance of 65 W/m$^2$ (e.g., by a xenon arc lamp) according to the International Organization for Standardization (ISO) 4892-2.

The term "ΔE" refers to CIELAB color space (also referred to as: "shift", or "difference") according to the "Lab display system" specified by the International Commission on Illumination. With this CIELAB color space, colors are defined by three categories L*, a*, and b* (also referred to herein as "L", "a", and "b", respectively), where, as used in the art, L* defines the luminance of a color, and a* and b* both define the hue and saturation characteristics of a given color.

In some embodiments, "ΔE" can be calculated using, for example, $\Delta E^*_{ab}$, $\Delta E^*_{94}$, or DE2000 metrics, where ΔE represents the difference in color between the initial composite and the composite upon exposure to the U.V. irradiation at the specified condition. The greater ΔE is, the greater the difference between the two colors is. Further embodiments of ΔE measurements are described hereinbelow under the Examples section.

In some embodiments, the composite exhibits a Δb value of less than 5, less than 4, less than 3, or less than 2, after 1000 hours exposure to U.V. irradiance of 65 W/m$^2$ (e.g., by a xenon arc lamp) according to ISO 4892-2, where Δb represents the difference in color saturation as defined by coordinate b of the Lab display system between the initial composite and the composite upon exposure to the U.V. irradiation at the specified condition In some embodiments, the composite is characterized by whiteness index variation (ΔWI) of less than 55%, less than 45%, less than 35%, less than 25%, less than 15% or less than 5% after 50-200 hours of radiation exposure in a defined range of KLy.

In some embodiments, the composite is characterized by a yellowness index variation (ΔYI) of less than 75%, less than 65%, less than 55%, less than 45%, less than 35%, less than 25%, less than 15% or less than 5% after 50-200 hours of radiation exposure in a defined range of KLy.

In some embodiments, by "radiation exposure" it is meant to refer to U.V. radiation exposure, as defined hereinthroughout (e.g., U.V.A. or U.V.B.).

In one embodiment, "characterized" is synonymous with comprising. In one embodiment, "characterized" is synonymous with consisting. In one embodiment, the term "composite" is interchangeable with the term "composition".

Mechanical Characterization

In some embodiments, the composite is characterized by a glass-transition temperature ($T_g$) in the range of from 60° C. to 120° C. In some embodiments, the composite is characterized by $T_g$ in the range of from 65° C. to 110° C. In some embodiments, the composite is characterized by $T_g$ in the range of from 75° C. to 95° C. In some embodiments, the composite is characterized by $T_g$ in the range of from 75° C. to 110° C. In some embodiments, the composite is characterized by $T_g$ in the range of from 65° C. to 95° C. In some embodiments, the composite is characterized by $T_g$ in the range of from 50° C. to 90° C. In some embodiments, the composite is characterized by $T_g$ in the range of from 70° C. to 110° C. In some embodiments, the composite is characterized by $T_g$ in the range of from 70° C. to 100° C.

In some embodiments, the composite is characterized by $T_g$ of 50° C., 55° C., 60° C., 65° C., 70° C., 75° C., 80° C., 85° C., 90° C., 95° C., 100° C., 105° C., 110° C., 115° C., or 120° C., including any value and range therebetween.

In some embodiments, the composite is characterized by Young's modulus in the range of from 10,000 to 30,000 MPa. In some embodiments, the composite is characterized by Young's modulus in the range of from 13,000 to 30,000 MPa. In some embodiments, the composite is characterized by Young's modulus in the range of from 16,000 to 25,000 MPa. In some embodiments, the composite is characterized by Young's modulus in the range of from 15,000 to 25,000 MPa. In some embodiments, the composite is characterized by Young's modulus in the range of from 10,000 to 25,000 MPa. In some embodiments, the composite is characterized by Young's modulus in the range of from 11,000 to 25,000 MPa. In some embodiments, the composite is characterized by Young's modulus in the range of from 15,000 to 30,000 MPa.

In some embodiments, the composite is characterized by Young's modulus of 10,000, 11,000, 12,000, 13,000, 14,000, 15,000, 16,000, 17,000, 18,000, 19,000, 20,000, 21,000, 22,000, 23,000, 24,000, 25,000, 26,000, 27,000, 28,000, 29,000, or 30,000 MPa, including any value and range therebetween.

The term "Young's modulus" refers to a measure of the stiffness of a given material. The Young's modulus can be calculated by dividing the tensile stress by the tensile strain.

In some embodiments, the composite is characterized by flexural strength in the range of from 40 to 110 MPa. In some embodiments, the composite is characterized by flexural strength in the range of from 50 to 110 MPa. In some embodiments, the composite is characterized by flexural strength in the range of from 55 to 110 MPa. In some embodiments, the composite is characterized by flexural strength in the range of from 60 to 95 MPa. In some embodiments, the composite is characterized by flexural strength in the range of from 50 to 120 MPa. In some embodiments, the composite is characterized by flexural strength in the range of from 60 to 110 MPa. In some embodiments, the composite is characterized by flexural strength in the range of from 60 to 100 MPa. In some embodiments, the composite is characterized by flexural strength in the range of from 50 to 95 MPa. In some embodiments, the composite is characterized by flexural strength in the range of from 45 to 95 MPa.

In some embodiments, the composite is characterized by flexural strength of 40, 45, 50, 55, 60, 65, 70, 75, 80, 85, 90, 95, 100, 105, or 110 MPa, including any value and range there between.

In some embodiments, the term "flexural strength", also known as yield strength or bend strength, is a mechanical parameter of a material or component defined as its ability to resist inelastic transverse deformation under load that can be readily quantified and compared using conventional assays, such as the transverse bending test.

In some embodiments, the composite is characterized by heat distortion temperature (HDT) of at least 35° C., at least 45° C., at least 55° C., at least 65° C., at least 70° C. or at least 75° C. In some embodiments, the composite is characterized by HDT in the range of from 55° C. to 110° C. In some embodiments, the composite is characterized by HDT in the range of from 65° C. to 110° C. In some embodiments, the composite is characterized by HDT in the range of from 55° C. to 100° C. In some embodiments, the composite is characterized by HDT in the range of from 65° C. to 100° C.

In some embodiments, the composite is characterized by HDT of 55° C., 60° C., 65° C., 70° C., 75° C., 80° C., 85° C., 90° C., 95° C., 100° C., 105° C., or 110° C., including any value and range therebetween.

In some embodiments, the term "heat distortion temperature (HDT)" as used herein is intended to refer to a temperature at which the composite is deformed when it is heated at a constant rate with a given load being applied thereto.

Additives

In some embodiments, the composition or the composite comprises an excipient. In some embodiments, the composition or the composite comprises a toughener. In some embodiments, the toughener is attached or bound to the cross-linked polymer. In some embodiments, the toughener is selected from, without being limited thereto, urethane mono acrylate, urethane diacrylate, urethane triacrylate, or any combination or a polymer thereof. In some embodiments, the toughener is characterized by a predetermined particle size and amount in the composition. In some embodiments, the toughener is made of one or more graft polymers. Graft polymers comprise, in some embodiments, methacrylate, methacrylate-butadiene-styrene polymers, acrylate-methacrylate-butadiene-styrene polymers, acrylonitrile, or acrylonitrile-butadiene-styrene polymers or copolymers, respectively.

In some embodiments, the toughener comprises a material selected from, without being limited thereto, a polyurethane, mono acrylate, polyurethanes diacrylate, polyurethanes triacrylate, or any combination thereof. In some embodiments, the toughener comprises or is in the form of a core-shell polymeric structure. In some embodiments, core-shell polymers comprise an elastomeric material. In some embodiments, the elastomeric material comprises a graft polymer and/or rubber toughener. In some embodiments, the core-shell polymeric toughener is phase separated from the acrylic based polymers. In one embodiment, the composite comprises a core-shell polymeric toughener. In one embodiment, a core-shell polymeric toughener is phase separated from the acrylic based polymer.

The term "elastomer" has a common meaning in the art, and, in some embodiments, refers to a synthetic rubber, plastic or other polymer which can be stretched to at least twice its original length, and then return to its original shape with force.

In some embodiments, the shell comprises a grafted polymeric material which is devoid of or substantially devoid of a reactive group. In some embodiments, the core-shell polymeric structure may also comprise a multi-core-shell polymeric structure.

Non-limiting examples of elastomers which may be used as a core material comprise polybutadiene, polyacrylates, polymethacrylates and their co- or terpolymers, optionally with polystyrene, polyacrylonitrile or polysulfide.

In some embodiments, the core comprises polybutadiene or polybutylacrylate. In some embodiments, the core comprises an elastomer comprising a styrene butadiene or a polymer thereof. In further exemplary embodiments, the core comprises an elastomer comprising a silicone or a polymer thereof.

Non-limiting examples of polymeric shell materials comprise polystyrene, polymethyl methacrylate, polyacrylonitrile, polyacrylate and polymethacrylate mono-, co- or terpolymers or styrene-acrylonitrile-glycidyl methacrylate terpolymers.

As demonstrated in the Examples section below specific types of toughener with a specific concentration may provide superior mechanical properties, e.g., reduction in flexural strength as well as a reduction in $T_g$ and HDT.

In some embodiments, the toughener is present at a concentration of 0.1% to 30%, by weight of the cross-linked polymer. In some embodiments, the toughener is present at a concentration of 1% to 30%, by weight of the cross-linked polymer. In some embodiments, the toughener is present at a concentration of 0.5% to 30%, by weight of the cross-linked polymer. In some embodiments, the toughener is present at a concentration of 0.5% to 25%, by weight of the cross-linked polymer. In some embodiments, the toughener is present at a concentration of 0.5% to 15%, by weight of the cross-linked polymer.

In some embodiments, the toughener is present at a concentration of 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, or 30%, by weight of the cross-linked polymer, including any value and range therebetween.

In some embodiments, the composite further comprises a coupling agent (also referred to as "binder"). In some embodiments, the coupling agent is configured to contact inorganic materials such as the inorganic aggregate and/or mineral. In some embodiments, the coupling agent is associated (e.g., physically attached or adsorbed) to the acrylic polymeric backbone and to at least one inorganic aggregate and/or mineral.

In some embodiments, the coupling agent is covalently attached to a monomeric unit of the polymeric backbone. In some embodiments, the coupling agent is derived from acryloyl.

In one embodiment, the terms "couple", "associated", "linked" (in distinction from "cross-linker"), and any grammatical derivative thereof, which are used herein interchangeably, describe a linkage between the organic and inorganic materials (e.g., inorganic aggregate and/or mineral and the acrylic polymer), carried out and/or facilitated by using coupling molecules, wherein the linkage may be covalent in a non-limiting fashion.

In some embodiments, the coupling agent is selected from, but is not limited to, alkoxysilane, or any derivative thereof.

In some embodiments, the coupling agent is present at a concentration in the range of 0.01% to 0.5%, by total weight of the composite. In some embodiments, the coupling agent is present at a concentration in the range of 0.01% to 0.4%, by total weight of the composite. In some embodiments, the coupling agent is present at a concentration in the range of 0.02% to 0.4%, by total weight of the composite. In some embodiments, the coupling agent is present at a concentration of 0.01%, 0.02%, 0.03%, 0.05%, 0.1%, 0.2%, 0.3%, 0.4%, or 0.5%, by total weight of the composite, including any value and range therebetween.

Preparation Methods

According to another aspect of some embodiments of the present invention, there is provided a method for obtaining the disclosed composite in an embodiment thereof, or composition comprising a composite made of a cross-linked polymer and an inorganic aggregate and/or mineral.

In some embodiments, the method comprises the steps of:
(i) mixing a plurality of materials comprising: an acrylic monomer, at least one cross-linker, a peroxide initiator, and one or more polymer stabilizers, thereby obtaining a mixture of the cross-linked polymer;
(ii) adding an inorganic aggregate and/or mineral to the mixture; and
(iii) curing the mixture at a temperature above 90° C.

In some embodiments, the mixing of step (i) further comprises adding a toughener.

In some embodiments, the cross-linked polymer is obtained by mixing a polymeric backbone, at least one cross-linker, a least one initiator, and optionally at least one toughener and one or more polymer stabilizers.

In some embodiments, the peroxide initiator is selected from, but is not limited to: di-benzoyl peroxide, lauroyl peroxide, tert-butyl hydroperoxide, cyclohexanone peroxide, methylethyl peroxide, tert-butyl peroxyoctoate, tert-butyl peroxybenzoate, dicumyl peroxide, 1,1-bis(tert-butyl peroxy)3,3,5-trim ethylcyclohexane, tert-butyl peroxymaleate, tert-butyl peroxymaleate, azobisisobutyronitrile (AIBN), and any derivative or combination thereof.

In some embodiments, the polymer stabilizer is selected from, without being limited thereto, a quinone, a phenol, an amine, or any combination thereof.

In some embodiments, the acrylic monomer of step (i) comprises MMA.

In some embodiments, the materials of step (i) further comprise PMMA and or a viscosity enhancing compound. In some embodiments, the materials of step (i) further comprise methacrylic acid (MAA).

In non-limiting exemplary embodiments, the mixed materials in step (i) comprise (by % w/w): 50 to 60% MMA, 10 to 20% 2-EHA, 2 to 10% polyurethane diacrylate, 15 to 25% PMMA 0.5 to 2% cross linker (e.g., triethylene glycol dimethacrylate) and 1 to 5% MAA.

In some embodiments, the cross-linked polymer is obtained by mixing (in step (i)) a polymeric backbone, at least one cross-linker, and at least one toughener. In some embodiments, the cross-linked polymer is obtained by mixing a polymeric backbone and at least one cross-linker.

Embodiments of the monomers (and the monomeric units), the ross-linker, the toughener, the peroxide initiator, the inorganic aggregate and/or mineral, and the polymer stabilizers are described hereinabove under "The Composition".

In some embodiments, the method further comprises an additional step prior to the curing step, of pouring the mixture or compounds of the mixture (e.g., the monomers, the cross-linker, the peroxide initiator) onto a support, a template, or a temporary support.

Non-limiting examples of support are selected from rubbers, papers, plastic or any other polymeric material, silicon sheet or the like, with or without a support frame or a shaping frame, and a mold, such as a rubber tray mold.

In some embodiments, the terms "cure", "curing", and any grammatical derivative thereof, which are used herein interchangeably, refer to a change in the physical properties of a material by chemical reaction through condensation, cross-linking, polymerization or vulcanization. Typically, but not exclusively, the curing is assisted by an action of heat and a catalyst, alone or, in some embodiments, in combination with a specified pressure.

In some embodiments, prior to the curing step, the mixture is poured into a mold in the form of a desired slab (e.g., at a size of 400 cm×200 cm×3 cm with or without wall shaping). In some embodiments, prior to the curing step, the mixture is compacted by a vacuum and/or vibration. In some embodiments, vibro-compression is performed at high pressure, e.g., of about 100 tons.

In some embodiments, the curing step further comprises a step of adding a coupling agent during the curing process.

In some embodiments, the method further comprises a step of adding suitable amounts of at least one additive to the mixture or to the slab product. This additive may include, for example, colorants, chemical reagents, antimicrobial substances, fungicidal agents, or the like, or any combination thereof. In some embodiments, the additive is added during the curing process. In some embodiments, the additive may be added to the mixture at various stages of production (e.g., addition to the blending of raw materials or during the mixing step).

In some embodiments, the additive may be present in the final composition, (also referred to as the "stone product"). In some embodiments, the additive may further determine various characteristics of the final composition. Such characteristics may include physical properties, such as: color, texture, display pattern, and the like; chemical properties, such as, for example, chemical resistance, pH properties, and the like; biological properties, such as, for example, antibacterial properties, and the like; and/or mechanical properties, such as, for example, toughness, flexural strength, scratch resistance, impact resistance, or the like.

In some embodiments, the term "colorant" may include dyes, pigments, a combination of colorants, and the like, or any combination thereof in any form, such as liquid, paste, fluid, or the like.

In some embodiments, the curing step is performed at a temperature (referred to as: "curing temperature") of above 70° C., above 80° C., above 90° C., above 95° C., above 100° C. or above 110° C. In some embodiments, the curing temperature is less than 130° C., less than 120° C., less than 115° C., less than 110° C., less than 105° C., less than 100° C., less than 95° C., or less than 90° C.

In some embodiments, the curing temperature is in the range of 70° C. to 130° C. In some embodiments, the curing temperature is in the range of from 80° C. to 130° C. In some embodiments, the curing temperature is in the range of from 90° C. to 130° C. In some embodiments, the curing temperature is in the range of from 70° C. to 120° C. In some embodiments, the curing temperature is in the range of from 80° C. to 120° C. In some embodiments, the curing temperature is in the range of from 90° C. to 120° C. In some embodiments, the curing temperature is in the range of from 95° C. to 120° C. In some embodiments, the curing temperature is in the range of from 70° C. to 110° C. In some embodiments, the curing temperature is in the range of from 80° C. to 110° C. In some embodiments, the curing temperature is in the range of from 90° C. to 110° C. In some embodiments, the curing temperature is in the range of from 95° C. to 110° C. In some embodiments, the curing temperature is in the range of from 95° C. to 105° C.

In some embodiments, the curing is performed at time duration (referred to as "curing duration time") of at least 20, at least 25, at least 30, at least 35, at least 40, at least 45, at least 50, at least 55, or at least 60 minutes. In some embodiments, the curing is performed at time duration of less than 40, less than 45, less than 50, less than 55, less than 60, less than 70, less than 90, or less than 120 minutes.

In some embodiments, the curing duration time is from 20 to 90 minutes. In some embodiments, the curing duration time is from 20 to 70 minutes. In some embodiments, the curing duration time is from 20 to 45 minutes. In some embodiments, the curing duration time is from 30 to 90 minutes. In some embodiments, the curing duration time is from 30 to 70 minutes. In some embodiments, the curing duration time is from 30 to 60 minutes. In some embodiments, the curing duration time is from 30 to 45 minutes.

Definitions

The term "composite", in one embodiment, is interchangeable with "composition". The term "composite", in one embodiment, is used herein to denote that the composition is made of at least two components, namely, made of non-pristine substances. In some embodiments, the two or more substances have different characteristics and, in each substance, retains its identity while contributing desirable properties to the whole.

In some embodiments, the term "monomer" refers to a molecule that may bind chemically to other molecules to form a polymer.

In some embodiments, the term "monomeric unit" refers to the repeat units, derived from the corresponding monomer. The polymer comprises or is made of the monomeric units. By "derived from" it is meant to refer to the compound obtained upon the polymerization process.

In some embodiments, the term "polymer" describes an organic substance composed of a plurality of repeating structural units (monomeric units) covalently connected to one another.

In some embodiments, the term "polymer backbone" generally refers to a polymer comprising monomeric units. It is to be understood that in the context of the present invention, the term "polymeric backbone" refers to the main chain of polymeric skeleton together with chain branches projecting from the polymeric skeleton. The branches may comprise one or more of either monomeric units as described herein.

In some embodiments, the terms "peroxide initiator" or "radical" refer to free radical building block(s) that can initiate polymerization. Since the initiator can generate a radical by abstracting hydrogen from a carbon-hydrogen bond, when it is used in combination with an organic material, such as a polymer, a chemical bond can be formed. Following creation of free radical monomeric units, polymer chains grow rapidly with successive addition of building blocks onto free radical sites.

The following water soluble exemplary initiators may be used, without being limited thereto: peroxides such as ammonium persulfate, potassium persulfate, sodium persulfate, hydrogen peroxide, benzoyl peroxide, cumene hydroperoxide, or di-t-butyl peroxide; a redox initiator that is a combination of the above-mentioned peroxide and a reducing agent such as a sulfite, a bisulfite, thiosulfate, formamidinesulfinic acid, or ascorbic acid; or an azo-based radical polymerization initiator, such as, without limitation, 2,2'-azobis(2-amidinopropane) (AIBN), AIBNCOOH, and 2,2'-azobis(2-amidinopropane), and potassium persulfate (PPS), or any derivative or combination thereof.

Further non-limiting embodiments of the initiator are described hereinabove.

In some embodiments, the size of the particles described herein represents an average size, or in some embodiments, a median size of a plurality of particle composites or particles.

As referred to herein, the terms "slab", "artificial marble", "engineered stone" and "quartz surfaces" may interchangeably be used. Thus, when referencing any of the terms "slab", "artificial marble", "engineered stone" and "quartz surfaces", it implies that all the terms are covered.

In some embodiments, the term "slab" also relates to any piece, region, or portion of a slab.

In some embodiments, the term "polymer stabilizer", or "stabilizer" refers to a material, such as a polymer, having a function that prevents oxidation, free radical formation and cross-linking reactions during polymerization.

In some embodiments, the term "alkyl" describes an aliphatic hydrocarbon including straight chain and branched chain groups. Preferably, the alkyl group has 21 to 100 carbon atoms, and more preferably 21-50 carbon atoms. Whenever a numerical range; e.g., "21-100", is stated herein, it implies that the group, in this case the alkyl group, may contain 21 carbon atom, 22 carbon atoms, 23 carbon atoms, etc., up to and including 100 carbon atoms. In the context of the present invention, a "long alkyl" is an alkyl having at least 20 carbon atoms in its main chain (the longest path of continuous covalently attached atoms). A short alkyl therefore has 20 or less main-chain carbons. The alkyl can be substituted or unsubstituted, as defined herein.

In some embodiments, the term "alkyl", as used herein, also encompasses saturated or unsaturated hydrocarbon, hence this term further encompasses alkenyl and alkynyl.

In some embodiments, the term "alkenyl" describes an unsaturated alkyl, as defined herein, having at least two carbon atoms and at least one carbon-carbon double bond. The alkenyl may be substituted or unsubstituted by one or more substituents, as described hereinabove.

In some embodiments, the term "alkynyl", as defined herein, is an unsaturated alkyl having at least two carbon atoms and at least one carbon-carbon triple bond. The alkynyl may be substituted or unsubstituted by one or more substituents, as described hereinabove.

In some embodiments, the term "cycloalkyl" describes an all-carbon monocyclic or fused ring (i.e., rings which share an adjacent pair of carbon atoms) group where one or more of the rings does not have a completely conjugated pi-electron system. The cycloalkyl group may be substituted or unsubstituted, as indicated herein.

In some embodiments, the term "aryl" describes an all-carbon monocyclic or fused-ring polycyclic (i.e., rings which share adjacent pairs of carbon atoms) groups having a completely conjugated pi-electron system. The aryl group may be substituted or unsubstituted, as indicated herein.

In some embodiments, the term "alkoxy" describes both an —O-alkyl and an —O-cycloalkyl group, as defined herein.

In some embodiments, the term "aryloxy" describes an —O-aryl, as defined herein.

Each of the alkyl, cycloalkyl and aryl groups in the general formulas herein may be substituted by one or more substituents, whereby each substituent group can independently be, for example, halide, alkyl, alkoxy, cycloalkyl, alkoxy, nitro, amine, hydroxyl, thiol, thioalkoxy, thiohydroxy, carboxy, amide, aryl and aryloxy, depending on the substituted group and its position in the molecule. Additional substituents are also contemplated.

In some embodiments, the term "acryloyl" describes a $H_2C=CH—C(=O)—R'$ group, where R' is as defined herein.

In some embodiments, the term "halide", "halogen" or "halo" describes fluorine, chlorine, bromine or iodine.

In some embodiments, the term "haloalkyl" describes an alkyl group as defined herein, further substituted by one or more halide(s).

In some embodiments, the term "haloalkoxy" describes an alkoxy group as defined herein, further substituted by one or more halide(s).

In some embodiments, the term "hydroxyl" or "hydroxy" describes a —OH group.

In some embodiments, the term "thiohydroxy" or "thiol" describes a —SH group.

In some embodiments, the term "thioalkoxy" describes both an —S-alkyl group, and a —S-cycloalkyl group, as defined herein.

In some embodiments, the term "thioaryloxy" describes both an —S-aryl and a —S-heteroaryl group, as defined herein.

In some embodiments, the term "amine" describes a —NR'R" group, with R' and R" as described herein.

In some embodiments, the term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furane, thiophene, imidazole, oxazole, thiazole, pyrazole, pyridine, pyrimidine, quinoline, isoquinoline and purine.

In some embodiments, the term "heteroalicyclic" or "heterocyclyl" describes a monocyclic or fused ring group having in the ring(s) one or more atoms such as nitrogen, oxygen and sulfur. The rings may also have one or more double bonds. However, the rings do not necessarily have a completely conjugated pi-electron system. Non-limiting representative examples are piperidine, piperazine, tetrahydrofurane, tetrahydropyrane, morpholino and the like.

In some embodiments, the term "carboxy" or "carboxylate" describes a —C(=O)—OR' group, where R' is hydrogen, alkyl, cycloalkyl, alkenyl, aryl, heteroaryl (bonded through a ring carbon) or heteroalicyclic (bonded through a ring carbon) as defined herein.

In some embodiments, the term "carbonyl" describes a —C(=O)—R' group, where R' is as defined hereinabove.

The above-terms also encompass thio-derivatives thereof (thiocarboxy and thiocarbonyl).

In some embodiments, the term "thiocarbonyl" describes a —C(=S)—R' group, where R' is as defined hereinabove.

In some embodiments, the "thiocarboxy" group describes a —C(=S)—OR' group, where R' is as defined herein.

In some embodiments, the "sulfinyl" group describes an —S(=O)—R' group, where R' is as defined herein.

In some embodiments, the "sulfonyl" or "sulfonate" group describes an —S(=O)$_2$—R' group, where R' is as defined herein.

In some embodiments, the "carbamyl" or "carbamate" group describes an —OC(=O)—NR'R" group, where R' is as defined herein and R" is as defined for R'.

In some embodiments, the "nitro" group refers to a —NO$_2$ group.

In some embodiments, the "cyano" or "nitrile" group refers to a —C≡N group.

In some embodiments, the term "azide" refers to a —N$_3$ group.

In some embodiments, the term "sulfonamide" refers to a —S(=O)$_2$—NR'R" group, with R' and R" as defined herein.

In some embodiments, the term "phosphonyl" or "phosphonate" describes an —O—P(=O)(OR')$_2$ group, with R' as defined hereinabove.

In some embodiments, the term "phosphinyl" describes a —PR'R" group, with R' and R" as defined hereinabove.

In some embodiments, the term "alkaryl" describes an alkyl, as defined herein, which substituted by an aryl, as described herein. An exemplary alkaryl is benzyl.

In some embodiments, the term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furane, thiophene, imidazole, oxazole, thiazole, pyrazole, pyridine, pyrimidine, quinoline, isoquinoline and purine. The heteroaryl group may be substituted or unsubstituted by one or more substituents, as described hereinabove. Representative examples are thiadiazole, pyridine, pyrrole, oxazole, indole, purine and the like.

In some embodiments, the terms "halo" and "halide", which are referred to herein interchangeably, describe an atom of a halogen, that is fluorine, chlorine, bromine or iodine, also referred to herein as fluoride, chloride, bromide and iodide.

In some embodiments, the term "haloalkyl" describes an alkyl group as defined above, further substituted by one or more halide(s).

General

As used herein the term "about" refers to ±10%.

The terms "comprise", "comprising", "includes", "including", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, and material arts.

As used herein, the term "treating" includes abrogating, substantially inhibiting, slowing or reversing the progression of a condition, of aesthetical symptoms of a condition.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples which, together with the above descriptions, illustrate the invention in a non-limiting fashion.

Glass transition temperature ($T_g$) and Heat deflection temperature (HDT) were measured using dynamic mechanical analysis (DMA) technique.

Example 1

Mechanical Characterization of Various Composite-Part A

Materials and Methods

In exemplary procedures, nine different composites were examined, comprising 10% of cross-linked polymer and 90% of quartz particles, in order to characterize their flexural strength, flexural modulus and heat distortion temperature (HDT).

As shown in Table 1, these samples contained:
- 3 types of acrylic mono-functional monomers: (i) of methyl-methacrylate (MMA), (ii) n-butyl acrylate (n-BA) and (iii) 2-ethylhexyl acrylate (2-EHA);
- 3 types of quartz particles with diameter of: (i) 0.2-0.5 mm, (ii) 0.06-0.2 mm; and (iii) 0.001-0.05 mm;
- 0.02% tri-ethylene glycol di-methacrylate (cross-linker);
- 0.12% coupling agent comprising methoxysilane;
- Di-benzoyl peroxide (DBP) initiator;
- 2,6-di-tert-butyl-4-methylphenol (TBP);
- Core-shell toughener (XT-100 from Arkema Inc.).

TABLE 1

| | Quartz particles | | | | Cross-linked polymer | | | | | | | |
|---|---|---|---|---|---|---|---|---|---|---|---|---|
| Sample no. | Percentage in composite (%) | Type 1 (%) | Type 2 (%) | Type 3 (%) | Percentage in composite (%) | MMA (%) $T_g=$ | n-BA (%) $T_g=$ | 2EHA (%) $T_g=$ | Toughener (%) | DBP (%) | TBP (%) | Curing time at 100° C. (min) |
| 1 | 90 | 50 | 10 | 40 | 10 | 80 | 0 | 20 | 5 | 0.1 | 0.01 | 40 |
| 2 | 90 | 50 | 10 | 40 | 10 | 80 | 10 | 10 | 5 | 0.1 | 0.01 | 40 |
| 3 | 90 | 50 | 10 | 40 | 10 | 80 | 0 | 20 | 5 | 0.28 | 0.00 | 25 |
| 4 | 90 | 50 | 10 | 40 | 10 | 60 | 20 | 20 | 5 | 0.1 | 0.01 | 40 |
| 5 | 90 | 70 | 30 | 10 | 10 | 80 | 0 | 20 | 5 | 0.1 | 0.01 | 40 |
| 6 | 90 | 50 | 10 | 40 | 10 | 80 | 0 | 20 | 15 | 0.1 | 0.01 | 40 |
| 7 | 85 | 50 | 10 | 40 | 15 | 80 | 10 | 10 | 5 | 0.15 | 0.015 | No. |

Characterization Methods

Composites were examined under spectrophotometer in order to characterize their whiteness index (WI) after 100 or 200 hours with intervals of 6 hours irradiation of UV-A/UV-B light and 6 hours under darkness and moisture conditions. UVA-340 lamps spectral irradiance ranges between 300 and 400 nm with an irradiance peak at 340 nm. UVB-313 lamps spectral irradiance ranges between 275 and 370 nm with an irradiance peak at 313 nm. U.V. experiments were done by QUV-machine on sample dimensions of 7×15 cm with a distance of 50 mm between the lamp and the sample.

In additional exemplary procedures, the light fastness property of the composites was examined according to ISO 4892-2, as described below.

Flexural modulus and flexural strength were tested by using Lloyd device, load cell of 10 kN, sample size of 20×10×150 mm and bar speed of 10 mm/min according to an internal standard based on standard No. 4491 of the Israeli Standards Institute.

The curing was performed at a temperature of 100° C. for 25-85 minutes.

Results

The characterization results are summarized in Table 2 below:

TABLE 2

| Number of samples | Flexural Strength (MPa) | flexural Modulus (MPa) | HDT (° C.) | Testing results | Remarks |
|---|---|---|---|---|---|
| 1 | 85 | 19000 | 85 | Pass | |
| 2 | 88 | 19500 | 88 | Pass | |
| 3 | 43 | 10000 | 82 | Does Not pass | Inferior results for cracks formation |
| 4 | 80 | 14500 | 55 | Does Not pass | Soft - low HDT |
| 5 | 50 | 12000 | 70 | Does Not pass | Not optimal distribution of varied sizes of quartz particles. Not homogeneous distribution in the cross- |

TABLE 2-continued

| Number of samples | Flexural Strength (MPa) | flexural Modulus (MPa) | HDT (° C.) | Testing results | Remarks |
|---|---|---|---|---|---|
| | | | | | linked polymer. Microcracks formation in slab bulk during shrinkage of cross-linked polymer. |
| 6 | 55 | 11500 | 68 | Does Not pass | Too low flexural modulus |
| 7 | 70 | 16000 | 80 | Pass | |

When 11.85% of cross-linked polymer instead of 10% was cured with quartz particles the composite was distorted and smelly.

Example 2

Mechanical Characterization of Various Composites-Part B

Materials and Methods

Unless stated otherwise, the samples contain:
The polymeric backbone comprising 3 types of acrylic mono-functional monomers: (i) MMA, (ii) n-butyl acrylate (n-BA) and (iii) 2-EHA;
Core-shell toughener (XT-100 or Durastrength 480 from Arkema Inc.) Di-benzoyl peroxide (Luperox 75, Luperox ANS50, Perkadox 16 or Paradox L40RPS from Arkema Inc.);
Triethylene glycol dimethacrylate—cross-linker 1% (SR-205 from Arkema Inc.);
White pigment powder or white pigment paste (titan premix, white paste P1823, white paste 9660PU/WE-6-NM from Florma);
Optionally methacrylic acid (MAA) 3%
Poly methyl methacrylate (PMMA); and
Polyurethane resin (G4230/G4267 by Rahn).

Different compositions, (as shown in Table 3) of cross-linked polymer were characterized by $T_g$ (loss modulus), flexural modulus, flexural strength at max loading (as described above), see Table 4.

TABLE 3

| Number of sample | MMA (%) | n-BA (%) | 2-EHA (%) | Toughener (%) | Curing Time (min) | Curing Temp. (° C.) | Additional Materials |
|---|---|---|---|---|---|---|---|
| 1 | 85 | 0 | 15 | 0 | 60 | 90/120 | |
| 2 | 80 | 0 | 20 | 0 | 30 | 120 | |
| 3 | 80 | 0 | 20 | 0 | 60 | 95 | |
| 4 | 80 | 0 | 20 | 0 | 40 | 95 | |
| 5 | 80 | 0 | 20 | 0 | 40 | 100 | |
| 6 | 80 | 0 | 20 | 0 | 40 | 100 | Peroxide paste |
| 7 | 80 | 0 | 20 | 0 | 0 | 100 | |
| 8 | 80 | 0 | 20 | 0 | 40 | 100 | white pigment |
| 9 | 80 | 0 | 20 | 10 | 40 | 100 | 20% PMMA |
| 10 | 60 | 20 | 20 | 0 | 40 | 100 | |
| 11 | 80 | 0 | 20 | 5 | 45 | 100 | 20% PMMA |
| 12 | 70 | 15 | 15 | 0 | 45 | 100 | |
| 13 | 70 | 15 | 15 | 0 | 45 | 100 | 4% Cross linker |
| 14 | 80 | 0 | 20 | 0 | 45 | 100 | 4% Cross linker and white pigment |
| 15 | 80 | 0 | 20 | 0 | 35 | 100 | 1.2% Peroxide paste |
| 16 | 80 | 0 | 20 | 0 | 45 | 100 | 1.5% Peroxide paste |
| 17 | 80 | 0 | 20 | 0 | 45 | 100 | 3% Cross linker and white pigment |
| 18 | 80 | 0 | 20 | 0 | 45 | 100 | 2% Cross linker and white pigment |
| 19 | 70 | 15 | 15 | 0 | 49 | 100 | |
| 20 | 70 | 15 | 15 | 0 | 45 | 100 | |

TABLE 4

| Number of sample | HDT (° C.) | Flexural strength (MPa) | Flexural modulus (MPa) | $T_g$ (° C.) |
|---|---|---|---|---|
| 1 | N.A | 64 | 24,184 | 92 |
| 2 | N.A | 80 | 23,351 | 79 |
| 3 | N.A | 76 | 22,264 | 78 |
| 4 | N.A | 70 | 22,910 | 80 |
| 5 | N.A | 78 | 22,443 | 79 |
| 6 | N.A | 51 | 18,707 | 66 |
| 7 | N.A | 81 | 20,459 | 77 |
| 8 | 79 | 65 | 20,033 | 83 |
| 9 | 82 | 83 | 19,703 | 83 |
| 10 | 52 | 56 | 15,477 | 47 |
| 11 | 84 | 82 | 21,670 | 84 |
| 12 | 71 | 75 | 20,724 | 64 |
| 13 | 88 | 75 | 24,126 | 84 |
| 14 | 78 | 73 | 23,539 | 70 |
| 15 | 84 | 79 | 23,875 | 84 |
| 16 | 85 | 75 | 23,469 | 83 |
| 17 | 83 | 78 | 22,818 | 81 |
| 18 | 84 | 79 | 23,194 | 81 |
| 19 | 77 | 80 | 22,631 | 76 |
| 20 | 78 | 81 | 20,824 | 78 |

Light Fasness Examination

In exemplary procedures, the U.V. stability including whiteness index (WI) was tested (as described above).
Table 5 below presents the results of whiteness tests of the sample as encoded in Table 4:

TABLE 5

| | UVA-340 | | UVB-313 | |
|---|---|---|---|---|
| Number of samples | 100 hrs. ΔWI (%) | 200 hrs. ΔWI (%) | 100 hrs. ΔWI (%) | 200 hrs. ΔWI (%) |
| 1 | −0.25 | −1.0 | −4.0 | −5.4 |
| 2 | −1.17 | −1.6 | −4.0 | −4.4 |
| 3 | 0.36 | | −6.4 | −7.3 |
| 4 | −1.96 | | −3.9 | −6.6 |
| 5 | 0.16 | −0.3 | −3.0 | −2.1 |
| 6 | 1.85 | 2.5 | −5.1 | −9.9 |

TABLE 5-continued

| Number of samples | UVA-340 100 hrs. ΔWI (%) | UVA-340 200 hrs. ΔWI (%) | UVB-313 100 hrs. ΔWI (%) | UVB-313 200 hrs. ΔWI (%) |
|---|---|---|---|---|
| 7 | −0.23 | −4.8 | −8.8 | −10.5 |
| 8 | −1.71 | −2.1 | −9.5 | −10.6 |
| 9 | −3.61 | −3.8 | −7.7 | −10.3 |
| 10 | −2.35 | −2.1 | −6.4 | −8.0 |
| 11 | −2.64 | | −9.2 | −9.3 |
| 12 | −1.46 | | −6.6 | −7.2 |
| 13 | −3.01 | −2.2 | −4.8 | −5.4 |
| 14 | −0.78 | −1.0 | −5.7 | −4.9 |
| 15 | −0.81 | −0.6 | −5.4 | −6.7 |
| 16 | 0.87 | 0.7 | −3.6 | −3.4 |
| 17 | 1.24 | 0.6 | −5.6 | −6.6 |
| 18 | −0.64 | −1.1 | −5.5 | −6.3 |
| 19 | 0.73 | 1.2 | −6.0 | −6.9 |
| 20 | −0.85 | −2.7 | −7.5 | −8.0 |

Further characterization of the light fastness properties is presented below in Example 8 in the context of the comparative study—acrylic vs. polyester resin.

Example 3

The Resin Content

In additional exemplary procedures, in order to test the effect of the resin vs. inorganic aggregate and/or mineral content on the acrylic slab properties, 2 types of filler compositions were tested:

Type 1—"Grain"—a composition characterized by a relatively large percentage of large sized quartz fractions.

Type 2—"Fine"—a composition characterized by a relatively large percentage of small sized quartz fractions.

The results are summarized in Tables 6 (for Type 1) and 7 (for Type 2) below.

TABLE 6

| Composition name | Grain 1 | Grain 2 | Grain 3 | Grain 4 | Grain 5 | Grain 6 |
|---|---|---|---|---|---|---|
| Large fractions of quartz (1-4 mm) [%] | 46.7 | 43 | 45.3 | 43.6 | 49 | 52.1 |
| Small-Medium fractions of quartz (0.06-1 mm) [%] | 29.5 | 32 | 27 | 26.5 | 31.1 | 33.5 |
| Quartz Powder (3 to 44 μm) [%] | 16.4 | 15.6 | 15.8 | 15.8 | 11.5 | 7 |
| Pigment powder [%] | 0.2 | 0.2 | 0.2 | 0.2 | 0.2 | 0.2 |
| Acrylic resin [%] | 5 | 7 | 9.5 | 11.7 | 6 | 5 |
| Di benzoyl Peroxide [%] | 1 | 1 | 1 | 1 | 1 | 1 |
| Alkoxisilane [%] | 1.2 | 1.2 | 1.2 | 1.2 | 1.2 | 1.2 |
| Non-powder: powder fractions weight ratio | 4.6 | 4.8 | 4.6 | 4.4 | 7 | 12.2 |
| Mixture behavior | Extremely dry. Particles do not adhere. | Good wetness, good adhesion between particles | High wetness | Extremely wet | Partially Dry | Dry |
| Mix quality [1-5]* | 1 | 5 | 3 | 2 | 2 | 2 |
| Slab after press | Cracks in the slab. Crumbling** | Uniform, no cracks | Uniform, slightly soft | Relatively uniform. Very soft | Relatively uniform | Relatively uniform |
| Slab after curing | Cracks and breaks*** | Uniform | Uniform | Uniform | Quite uniform | Dry, areas with quartz falling Off**** |
| Production feasibility | Not Feasible | Feasible | Feasible | Feasible | Feasible | Not Feasible |

Figure 1B:
Figure 1C:
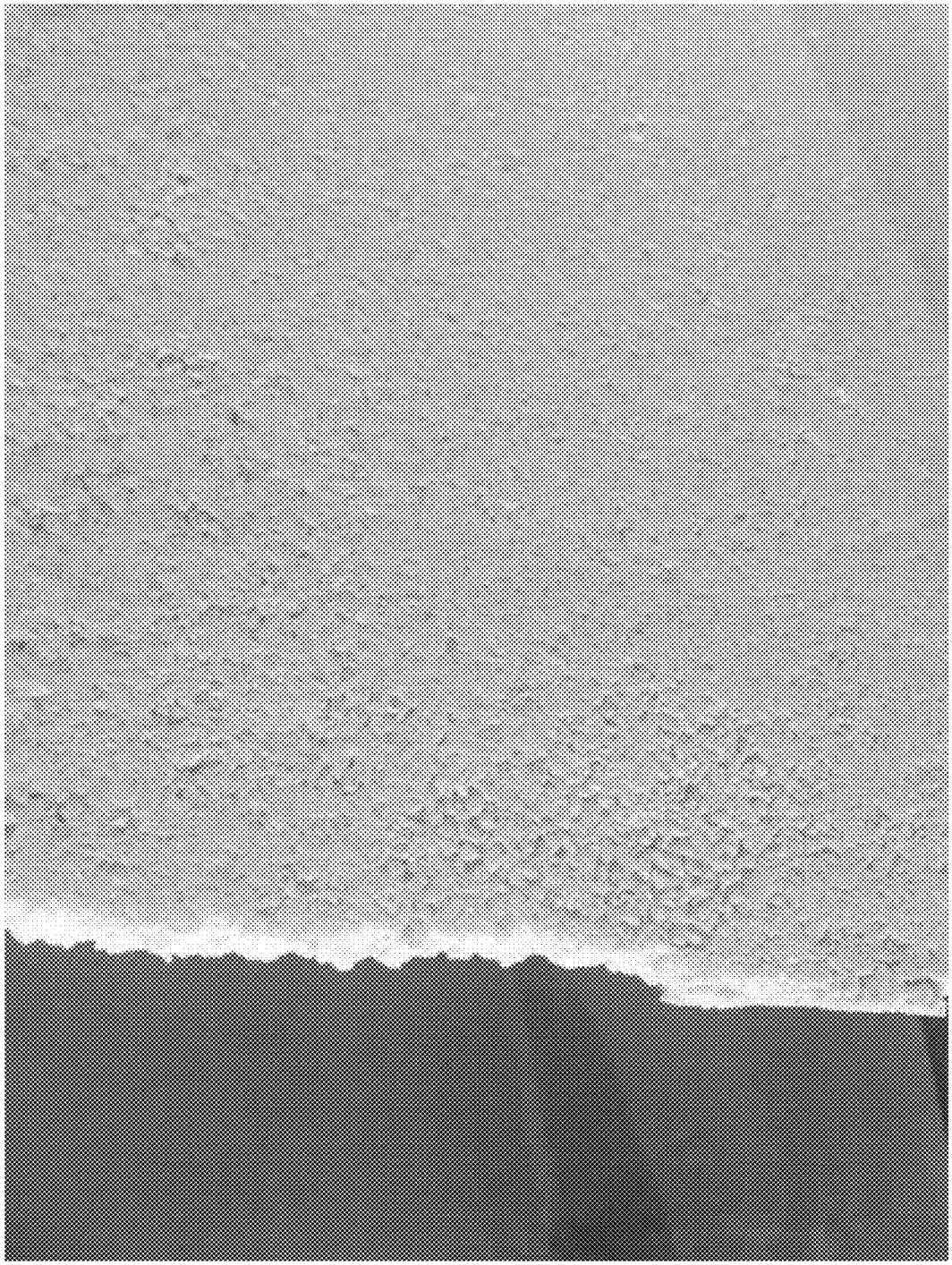

*Mix quality scale: 1—impossible to work with the mixture, 5—ideal mixture;
**See FIG. 1A;
***See FIG. 1B;
****See FIG. 1C.

TABLE 7

| Composition name | Fine 1 | Fine 2 | Fine 3 | Fine 4 | Fine 5 | Fine 6 | Fine 7 |
|---|---|---|---|---|---|---|---|
| Large fractions of quartz (1-4 mm) [%] | 0 | 0 | 0 | 0 | 0 | 0 | 0 |
| Small-Medium fractions of quartz (0.06-1 mm) [%] | 60.2 | 57.4 | 56.3 | 54.6 | 57.3 | 52 | 47.2 |
| Quartz Powder (3 to 44 μm) [%] | 26.5 | 25.8 | 24.9 | 23.5 | 26 | 31.3 | 36.1 |
| Pigment [%] | 0.1 | 0.1 | 0.1 | 0.1 | 2 | 2 | 2 |
| Acrylic resin [%] | 11 | 14.5 | 16.5 | 19.5 | 12.5 | 12.5 | 12.5 |
| Di benzoyl Peroxide [%] | 1 | 1 | 1 | 1 | 1 | 1 | 1 |
| Alkoxisilane [%] | 1.2 | 1.2 | 1.2 | 1.2 | 1.2 | 1.2 | 1.2 |
| Non powder: powder fractions weight ratio | 2.3 | 2.2 | 2.3 | 2.3 | 2.2 | 1.7 | 1.3 |
| Mixture behavior | Dry. Poor adhesion between particles | Good mixture, good adhesion between particles | High wetness | Practically liquid | Good mixture, good adhesion between particles | Good mixture, good adhesion between particles | OK mixture, a little dry |
| Mix quality [1-5]* | 1 | 5 | 3 | 1 | 5 | 4 | 3 |
| Slab after press | Cracks in the slab** | Uniform, no cracks | Uniform, soft | Impossible to press*** | Uniform, no cracks | Uniform, no cracks | No cracks, Many paper notches |
| Slab after curing | Cracks and breaks | Uniform | Uniform | Multiple bubbles**** | Uniform | One paper notch | many paper notches, impossible to polish***** |
| Production feasibility | Not feasible | Feasible | Feasible | Not feasible | Feasible | Feasible | Not feasible |

Figure 2:
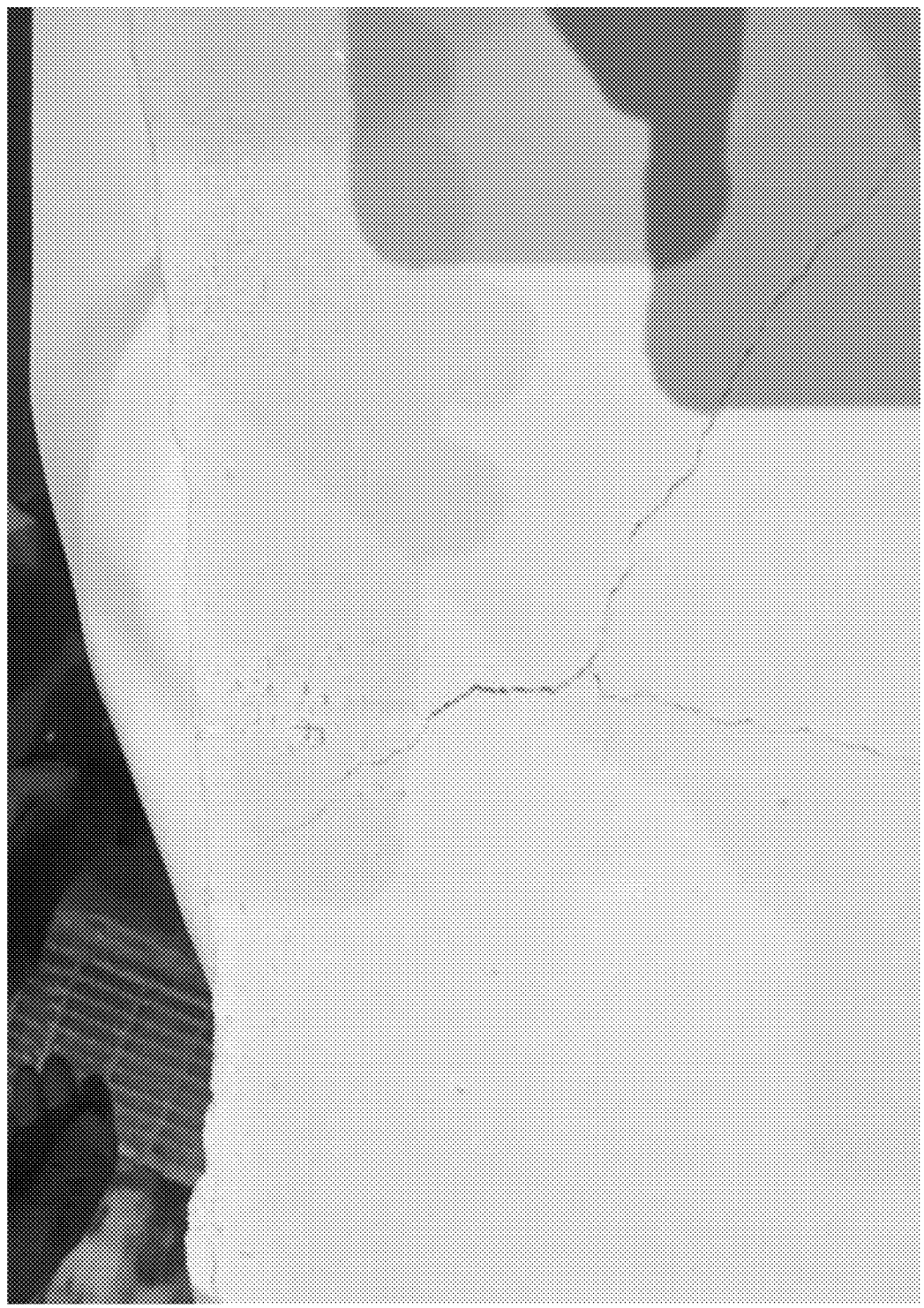
FIG. 2 presents a photograph demonstrating cracks in the slab of "Fine 1" (11% acrylic resin) as described in Table 6 below, after pressing.
Figure 3A:
FIGS. 3A-3C present photographs demonstrating the slab as described in Table 6 below: "Fine 4" (19.5% acrylic resin) upon pressing (FIG. 3A) and the bubbles formed in the slab after curing (FIG. 3B); and "Fine 7" showing slab made of non-powder: powder fraction weight ratio of 1.3: demonstrating many paper notches (impossible to polish) after curing (FIG. 3C).
Figure 3B:
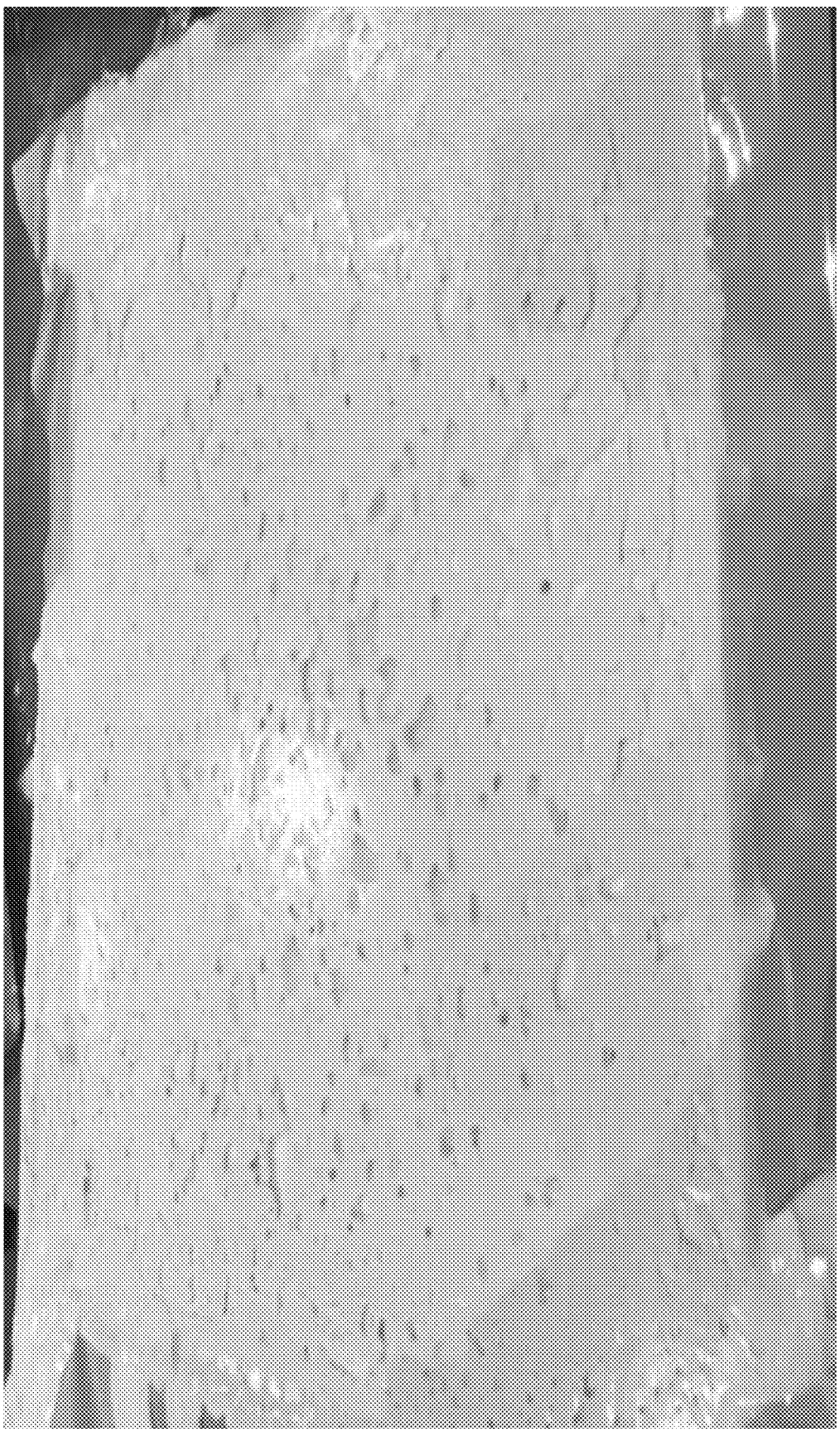
Figure 3C:

*Mix quality scale: 1—impossible to work with mixture, 5—ideal mixture
**See FIG. 2;
***See FIG. 3A;
****See FIG. 3B;
*****see FIG. 3C.

Example 4

The Monomeric Units

In additional exemplary procedures, the slab was tested with respect to the composition of the acrylic monomeric units. As shown in Table 8 below, the main advantage of 2-EHA monomeric unit is providing desired flexibility to the slab.

TABLE 8

| Engineered Stone Type* | Flexural Strength (MPa) | Flexural Modulus (MPa) |
|---|---|---|
| Desired value | 75-90 | 17000-20000 |
| Acrylic resin - 100% MMA | 97 | 23284 |
| Acrylic resin - 80% MMA, 20% 2-EHA | 88 | 20073 |

*Both slabs contain 88% quartz, 11.9% acrylic resin, and 0.1% alkoxysilane

Example 5

The Toughener

In additional exemplary procedures, the slab was tested with respect to the incorporation of the toughener. As shown in Table 9 below, the main advantage toughener is providing desired flexibility to the slab.

Specifically, as shown in Table 9, a reduction in flexural strength as well as a reduction in $T_g$ and HDT was demonstrated upon the incorporation of the toughener, indicating a decrease in the cross-linking density and increased in the flexibility of the slab.

TABLE 9

| Sample No. | MMA % | 2-EHA % | PMMA % | MAA % | Triethylene Glycol Dimethacrylate [%] | Polyurethane (PU) Diacrylate [%] | Viscosity (cP) | Compatibility for Mixing with Quartz for Engineered Stone |
|---|---|---|---|---|---|---|---|---|
| 1 | 76.8 | 14.2 | 0 | 3 | 1 | 5 | 2.5 | Not compatible |
| 2 | 49.8 | 14.2 | 27 | 3 | 1 | 5 | 1506 | Not compatible |
| 3 | 51.8 | 14.2 | 25 | 3 | 1 | 5 | 632 | compatible |
| 4 | 53.8 | 14.2 | 23 | 3 | 1 | 5 | 316 | compatible |
| 5 | 56.8 | 14.2 | 20 | 3 | 1 | 5 | 123 | compatible |

Example 6

Acrylic Vs. Polyester Resin—a Comparative Study

In additional exemplary procedures, the acrylic based slab composition was compared to the polyester based slab composition, showing the advantage of the acrylic-based composition, as described below and summarized in Table 10.

The polyester based composition comprised:

Quartz –88%

Unsaturated polyester –11.9%

Alkoxysilane –0.1%

The acrylic based composition comprised:

Quartz 88%

Acrylic monomers mixture (Resin) –11.9%*

Alkoxysilane –0.1%

The resin composition comprised:

MMA –56.5%

2-EHA –14%

Methacrylic acid –3%

PMMA –20%

PU diacrylate (toughener) –5%

Triethylene glycol dimethacrylate (cross linker) –1.5%

In additional exemplary procedures, two different compositions were produced and characterized for their light fastness, as shown in Table 10 below

TABLE 10

| | Sample 1 | Sample 2 |
|---|---|---|
| Small-Medium fractions of quartz (0.06-1 mm) [%] | 56 | 56 |
| Quartz Powder [%] | 27 | 27 |
| Pigment [%] | 3 | 3 |
| Acrylic resin [%] | 0 | 13 |
| Unsaturated polyester resin [%] | 13 | 0 |
| Peroxide - Trigonox 42 PR | 2 | 0 |
| Di benzoyl Peroxide [%] | 0 | 1 |

In exemplary procedures, the mixtures were pressed and cured according to the appropriate conditions:

For sample #1-40 minutes at 90° C.

For sample #2-55 minutes at 90° C.

TABLE 11

| Engineered Stone Type | Flexural Strength (Mpa) | flexural Modulus (MPa) | HDT (° C.) | $T_g$ (° C.) | Decrease in WI after 100 hrs of UVB-313 Exposure | Delta E after 1160 hrs Exposure in xenon (according to ISO 4892-2) |
|---|---|---|---|---|---|---|
| Desired value | 75-90 | 17000-20000 | 55-75 | 60-85 | Below 15% | Below 2 |
| Polyester based | 78 | 18600 | 52.1 | 58 | 68% | 7 |
| Acrylic resin based | 90 | 20073 | 70.1 | 66.6 | 7% | 1.8 |

As shown herein (Table 11) and above (Table 10), the disclosed composites exhibit the advantage, in all the parameters tested (especially, with respect to the change in WI and delta E upon exposure to UVB-313 and xenon lamp).

Further results of the U.V.A. test are presented in Table 12 below, demonstrating that the acrylic slab has better U.V.—stability than the polyester slab. Thus, polyester degradation is faster than the acrylic polymer.

TABLE 12

| | UVA-340 | |
|---|---|---|
| Tested Sample | 100 hrs. ΔWI (%) | 200 hrs. ΔWI (%) |
| Acrylic slab | 0.2-3% | 4-12% |
| Polyester slab | 1.3-3% | N.A |

After curing, the samples were tested for their lightfastness.

The samples were measured using a portable spectrophotometer (by DATACOLOR) and the L-a-b values were measured. In exemplary procedures, the samples were placed in an arc xenon instrument (Sunset XXL+by ATLAS), and the tests were performed in accordance to ISO 4892-2.

The test conditions were as follows:

Irradiance –65 W/m$^2$

Temp –38° C.

Humidity –65%

1000 hours per cycle.

In exemplary procedures, after the 1000 hours cycle, sample's L-a-b values were measured again.

For color change indication, Delta E was calculated according to the formula:

$$\delta E = \sqrt{(\Delta L)^2 + (\Delta b)^2 + (\Delta b)^2}$$

Where Delta $L = L_{after\ exposure} - L_{before\ exposure}$; Delta $a = a_{after\ exposure} - a_{before\ exposure}$ Delta $b = b_{after\ exposure} - b_{before\ exposure}$ For yellowness change, Delta b (Delta b=b after exposure–b before exposure) was used.

Table 13 below shows the difference in both delta E and delta b between sample #1 (polyester based) and sample #2 (acrylic based).

TABLE 13

| Sample | Delta E | Delta b |
| --- | --- | --- |
| 1 (Polyester based white slab) | 7 | 5.2 |
| 2 (Acrylic based white slab) | 1.8 | 1.6 |

Taken together, it is concluded that acrylic based slab has a significant advantage compared to a polyester based slab.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composite comprising: (a) an acrylic polymer resin, and (b) an inorganic aggregate, wherein said acrylic polymer resin is present in an amount of 5 to 20% by weight of said composite, and wherein the acrylic polymer resin comprises monomeric units selected from acrylate, methacrylate (MMA) and monomers of at least one of methacrylic acid or acrylic acid and polymethylmethacrylate (PMMA),
wherein the composite comprises a pigment and 0.02 to 0.4% by weight silane.

2. The composition of claim 1, wherein the acrylic polymer resin comprises at least 15% by weight PMMA.

3. The composition of claim 1, wherein said inorganic aggregate is selected from the group consisting of: quartz, quartzite, clay, calcium carbonate, aluminum tri-hydroxide, glass particles, magnesium hydroxide, or any combination thereof.

4. The composite of claim 1, wherein at least 50% of the monomeric units comprise MMA, 2-ethylhexyl acrylate (2-EHA) or both.

5. The composition of claim 1, further comprising 0.2-2.0 wt. % of a cross-linker.

6. The composition of claim 5, wherein the cross-linker is selected from the group consisting of: triethylene glycol diacrylate, trimethylolpropane triacrylate (TMPTA), trimethylolpropane trimethacrylate (TMPTMA), pentaerythritol tetraacrylate, dipentaerithritol hexaacrylate, dendritic acrylates, and methacrylates having at least two functional groups.

7. The composition of claim 1, further comprising a toughener.

8. The composition of claim 7, wherein said toughener is selected from the group consisting of urethane monoacrylate, urethane diacrylate, urethane triacrylate, or any combination thereof.

9. The composition of claim 7, wherein said toughener is present at a concentration of 0.5% to 15% by weight of said acrylic polymer resin.

10. The composition of claim 1, wherein said methacrylic acid or acrylic acid are present at a concentration ranging from 1 to 5% by weight of said acrylic polymer resin.

11. A method for obtaining a composite comprising an acrylic polymer and at least one inorganic aggregate, the method comprising the steps of:
(a) mixing a plurality of acrylic monomers selected from acrylate, methacrylate (MMA) or any derivative thereof and monomers of at least one of methacrylic acid or acrylic acid;
(b) adding to said mixture polymethylmethacrylate (PMMA);
(c) adding to said mixture a pigment and 0.02 to 0.4% by weight silane;
(d) adding an inorganic aggregate to said mixture, the inorganic aggregate and/or mineral being present at a concentration of 80% to 95% by weight of said mixture; and
(e) curing said mixture at a temperature of above 80° C., thereby obtaining said composition.

* * * * *